US012600155B2

(12) United States Patent
Chun et al.

(10) Patent No.: US 12,600,155 B2
(45) Date of Patent: Apr. 14, 2026

(54) ALUMINUM EXTERIOR PANEL AND METHOD FOR MANUFACTURING SAME

(71) Applicant: SAMSUNG ELECTRONICS CO., LTD., Suwon-si (KR)

(72) Inventors: Jihwan Chun, Suwon-si (KR); Kyunghwan Lee, Suwon-si (KR); Youngdeog Koh, Suwon-si (KR); Kwangjoo Kim, Suwon-si (KR); Jinju Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/581,657

(22) Filed: Feb. 20, 2024

(65) Prior Publication Data

US 2024/0190154 A1 Jun. 13, 2024

Related U.S. Application Data

(63) Continuation of application No. PCT/KR2023/000236, filed on Jan. 5, 2023.

(30) Foreign Application Priority Data

Jan. 11, 2022 (KR) ........................ 10-2022-0004276

(51) Int. Cl.

| | |
|---|---|
| ***C25D 11/04*** | (2006.01) |
| ***B41M 5/00*** | (2006.01) |
| ***C25D 11/24*** | (2006.01) |

(52) U.S. Cl.

CPC ........ *B41M 5/0011* (2013.01); *B41M 5/0058* (2013.01); *C25D 11/246* (2013.01)

(58) Field of Classification Search

CPC ..................................................... C25D 11/04
USPC ..................................................... 428/472.2
See application file for complete search history.

(56) References Cited

U.S. PATENT DOCUMENTS

| | | | |
|---|---|---|---|
| 9,434,132 | B2 | 9/2016 | Van Duffel et al. |
| 10,470,312 | B2 | 11/2019 | Yoshihara et al. |
| 11,099,502 | B2 | 8/2021 | Stowitts |
| 2007/0182327 | A1 | 8/2007 | Kim et al. |
| 2014/0272291 | A1 | 9/2014 | Moon et al. |

(Continued)

FOREIGN PATENT DOCUMENTS

| | | |
|---|---|---|
| JP | 2009-120785 | 6/2009 |
| JP | 5733481 | 6/2015 |

(Continued)

OTHER PUBLICATIONS

International Search Report dated Apr. 26, 2023 in International Patent Application No. PCT/KR2023/000236.

(Continued)

*Primary Examiner* — Katherine A Christy
(74) *Attorney, Agent, or Firm* — STAAS & HALSEY LLP

(57) ABSTRACT

A manufacturing method of an aluminum exterior panel including: preparing an aluminum material; anodizing to form pores on a surface of the aluminum material; performing atmospheric-pressure plasma treating, at room-temperature, to improve hydrophilicity of the surface of the aluminum material on which the pores are formed; digital printing of implementing a color and an image on the surface of the aluminum material with improved hydrophilicity; and sealing to close the pores.

14 Claims, 13 Drawing Sheets

(56) References Cited

U.S. PATENT DOCUMENTS

| | | | |
|---|---|---|---|
| 2017/0233860 A1 | 8/2017 | Nagayama et al. | |
| 2018/0049337 A1* | 2/2018 | Curran | B32B 15/04 |
| 2018/0361630 A1* | 12/2018 | Kim | B29C 35/0805 |

FOREIGN PATENT DOCUMENTS

| | | |
|---|---|---|
| JP | 6639585 | 2/2020 |
| KR | 10-2005-0102348 | 10/2005 |
| KR | 2007-59397 | 3/2007 |
| KR | 10-0817038 | 4/2008 |
| KR | 10-2009-0074365 | 7/2009 |
| KR | 10-2010-0085704 | 7/2010 |
| KR | 10-2012-0045469 | 5/2012 |
| KR | 10-1473641 | 12/2014 |
| KR | 10-1524822 | 6/2015 |
| KR | 10-1754559 | 7/2017 |
| KR | 10-1844956 | 4/2018 |
| KR | 10-1984799 | 5/2019 |

OTHER PUBLICATIONS

PCT/ISA/237 dated Apr. 26, 2023 in corresponding International Patent Application No. PCT/KR2023/000236.

* cited by examiner

BOUNDARY LINES ARE NOT GENERATED

ALUMINUM EXTERIOR PANEL AND METHOD FOR MANUFACTURING SAME

CROSS-REFERENCE TO RELATED APPLICATION

This application is a continuation application, under 35 U.S.C. § 111(a), of international application No. PCT/KR2023/000236, filed on Jan. 5, 2023, which claims priority under 35 U.S.C. § 119 to Korean Patent Application No. 10-2022-0004276, filed Jan. 11, 2022, the disclosures of which are incorporated herein by reference in their entireties.

BACKGROUND

Field

The present invention relates to an aluminum exterior panel and a manufacturing method thereof, and more particularly, to an aluminum exterior panel which is manufactured using room-temperature, atmospheric-pressure plasma and a manufacturing method thereof.

Description of the Related Art

In recent years, exterior panels applied to home appliances such as a refrigerator, a washing machine, a dish washer, an oven, and a hood are manufactured to directly implement a color on a surface thereof to give an aesthetic effect.

Conventionally, in order to implement a color on an aluminum surface, a series of aluminum material preparing, anodizing, digital printing, and pore sealing processes has been performed. However, as the pore sealing process is performed at a high temperature, ink in the pores is partially removed, and ink on the aluminum surface is completely removed. Therefore, color fading and resolution reduction problems occur in a digital printing layer.

In order to address the color fading and resolution reduction problems, a thermal drying process may be performed after the digital printing process. Although the thermal drying process is performed to improve a physical bonding force between ink molecules and prevent ink removal, effects of the thermal drying process are insignificant, and effectiveness is low.

Also, in order to address the color fading and resolution reduction problems, ultraviolet (UV) curing printing may be performed. Here, a poly-coating layer is formed to improve adhesion of UV curing printing, and a high-gloss film is adhered after the UV curing printing in order to prevent color fading. However, due to the formation of the coating layer and the adhesion of the film, it becomes difficult to express the natural texture of the material, and material costs increase.

SUMMARY

A manufacturing method of an aluminum exterior panel according to one embodiment of the present invention may include: preparing an aluminum material; anodizing to form pores on a surface of the aluminum material; performing atmospheric-pressure plasma treating, at room-temperature, to improve hydrophilicity of the surface of the aluminum material on which the pores are formed; digital printing of implementing a color and an image on the surface of the aluminum material with improved hydrophilicity; and sealing to close the pores.

Also, the manufacturing method of an aluminum exterior panel according to one embodiment of the present invention may further include natural drying after the digital printing.

Also, in the manufacturing method of an aluminum exterior panel according to one embodiment of the present invention, the atmospheric-pressure plasma treating may be performed in a vertical jet rotating manner.

Also, in the manufacturing method of an aluminum exterior panel according to one embodiment of the present invention, a vertical jet nozzle for the performing of the atmospheric-pressure plasma treating may have a diameter in a range of 60 mm to 80 mm.

Also, in the manufacturing method of an aluminum exterior panel according to one embodiment of the present invention, a number of rotations of the vertical jet rotating manner, may be in a range of 12,000 rpm to 30,000 rpm.

Also, in the manufacturing method of an aluminum exterior panel according to one embodiment of the present invention, the atmospheric-pressure plasma treating may be performed with a nozzle movement speed in a range of 50 mm/s to 500 mm/s and an output in a range of 500 W to 1,500 W.

Also, in the manufacturing method of an aluminum exterior panel according to one embodiment of the present invention, in the atmospheric-pressure plasma treating, an interval between a nozzle and the surface of the aluminum material may be in a range of 1 mm to 4 mm.

Also, in the manufacturing method of an aluminum exterior panel according to one embodiment of the present invention, a contact angle between water and the surface of the aluminum material on which the atmospheric-pressure plasma treating is performed may be 30° or less.

Also, in the manufacturing method of an aluminum exterior panel according to one embodiment of the present invention, digital printing may be performed within an hour after the atmospheric-pressure plasma treating.

Also, in the manufacturing method of an aluminum exterior panel according to one embodiment of the present invention, the natural drying operation may be performed for 5 to 10 minutes at room temperature.

Also, in the manufacturing method of an aluminum exterior panel according to one embodiment of the present invention, the sealing may be performed by dipping the aluminum material for 10 to 30 minutes in a solution containing 3 wt % to 4 wt % of nickel acetate at a temperature in a range of 80° C. to 100° C.

Also, in the manufacturing method of an aluminum exterior panel according to one embodiment of the present invention, an average of L*a*b* color difference (ΔE) values in the aluminum material on which the digital printing is performed and the aluminum material on which the sealing is performed may be 5 or less.

Also, an aluminum exterior panel with an improved image resolution according to one embodiment of the present invention may include: an aluminum material; pores formed on a surface of the aluminum material; a digital printing layer on one surface or all surfaces of the aluminum material on which the pores are formed; and an aluminum oxide film on the digital printing layer.

Also, in the aluminum exterior panel with an improved image resolution according to one embodiment of the present invention, the aluminum material may have a thickness in a range of 0.5 mm to 5 mm.

Also, in the aluminum exterior panel with an improved image resolution according to one embodiment of the present invention, the pores may have a depth in a range of 10 μm to 30 μm.

Also, in the aluminum exterior panel with an improved image resolution according to one embodiment of the present invention, the aluminum oxide film may have a thickness in a range of 10 μm to 30 μm.

Also, a refrigerator according to one embodiment of the present invention may include: a main body; and a door configured to open or close the main body, at least one of the main body and the door may include an aluminum exterior panel with an improved image resolution, and the aluminum exterior panel may include an aluminum material, pores formed on a surface of the aluminum material, a digital printing layer provided on one surface or all surfaces of the aluminum material on which the pores are formed, and an aluminum oxide film provided on the digital printing layer.

Also, in the refrigerator according to one embodiment of the present invention, the aluminum material may have a thickness in a range of 0.5 mm to 5 mm.

Also, in the refrigerator according to one embodiment of the present invention, the pores may have a depth in a range of 10 μm to 30 μm.

In addition, in the refrigerator according to one embodiment of the present invention, the aluminum oxide film may have a thickness in a range of 10 μm to 30 μm.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
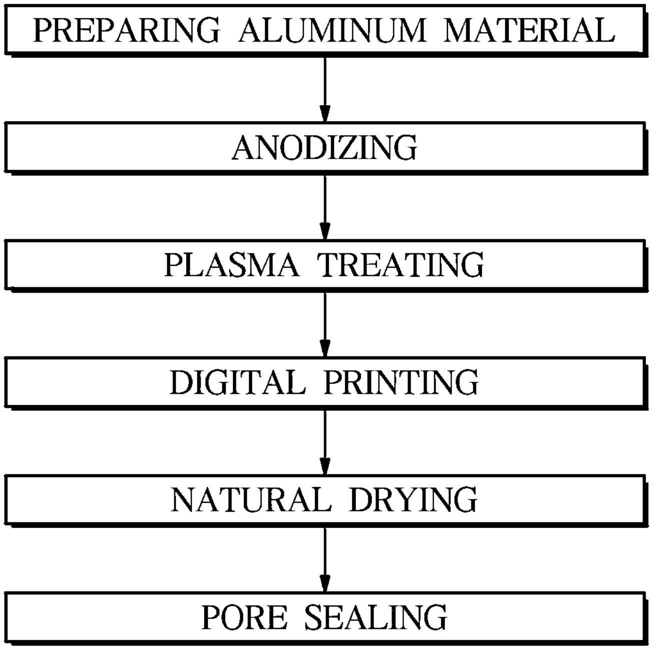
FIG. 1 is a flowchart of a manufacturing method of an aluminum exterior panel according to one example of the present invention.

Hereinafter, embodiments of the present invention will be described in detail with reference to the accompanying drawings. The following embodiments are presented to sufficiently convey the spirit of the present invention to those of ordinary skill in the art to which the present invention pertains. The present invention is not limited to the embodiments presented herein and may also be embodied in different forms. In the drawings, illustration of parts irrelevant to the description may be omitted to clarify the present invention, and sizes of components may be somewhat exaggerated to help understanding.

Throughout the specification, when a certain part is described as "including" a certain component, unless particularly described otherwise, this means that the part may further include other components instead of excluding other components.

A singular expression includes a plural expression unless the context clearly indicates otherwise.

A manufacturing method of an aluminum exterior panel according to one embodiment of the present invention may include: preparing an aluminum material; anodizing for forming pores on a surface of the aluminum material; room-temperature, atmospheric-pressure plasma treating for improving hydrophilicity of the surface of the aluminum material on which the pores are formed; digital printing of implementing a color and an image on the surface of the aluminum material whose hydrophilicity is improved; and pore sealing for closing the pores.

Also, the manufacturing method of an aluminum exterior panel according to one embodiment of the present invention may further include natural drying after digital printing.

The present invention is directed to an aluminum exterior panel in which room-temperature, atmospheric-pressure plasma treating is performed to inject a large amount of ink into pores, thus addressing color fading and improving a resolution after pore sealing, and a manufacturing method thereof.

According to one example of the present invention, it is possible to provide an aluminum exterior panel and a manufacturing method thereof in which hydrophilicity of a surface of an aluminum material is secured through room-temperature, atmospheric-pressure plasma treating to inject a large amount of ink into pores, thereby addressing color fading and improving a resolution after pore sealing.

However, advantageous effects that can be achieved by an aluminum exterior panel and a manufacturing method thereof according to embodiments of the present invention are not limited to those mentioned above, and other unmentioned advantageous effects should be clearly understood by those of ordinary skill in the art to which the present invention pertains from the description below.

A manufacturing method of an aluminum exterior panel according to one embodiment of the present invention may include: preparing an aluminum material; anodizing for forming pores on a surface of the aluminum material; room-temperature, atmospheric-pressure plasma treating for improving hydrophilicity of the surface of the aluminum material on which the pores are formed; digital printing for implementing a color and an image on the surface of the aluminum material whose hydrophilicity is improved; and pore sealing for closing the pores.

FIG. 1 is a flowchart of a manufacturing method of an aluminum exterior panel according to one example of the present invention.

Referring to FIG. 1, a manufacturing method of an aluminum exterior panel according to one embodiment of the present invention may include a series of preparing, anodizing, plasma treating, digital printing, natural drying, and pore sealing.

In the present invention, an anodizable aluminum alloy from 1000 to 7000 series aluminum alloy may be prepared as an aluminum material. The aluminum material may have a thickness in a range of 0.5 mm to 5.0 mm. However, the present invention is not limited thereto, and the type and thickness of the aluminum material may be changed according to the purpose and shape.

The manufacturing method of an aluminum exterior panel according to one embodiment of the present invention may include the anodizing for forming pores on a surface of the aluminum material. By forming fine pores on the surface of the aluminum material through anodizing, adhesion of a digital printing layer may be improved.

The anodizing may be performed by applying a voltage in a range of 12 V to 17 V using a solution containing 18 wt % to 22 wt % of sulfuric acid at a temperature in a range of 18° C. to 23° C. Here, preferably, the anodizing may be performed under a condition in which the amount of dissolved aluminum is in a range of 5 g/L to 15 g/L.

Figure 2:
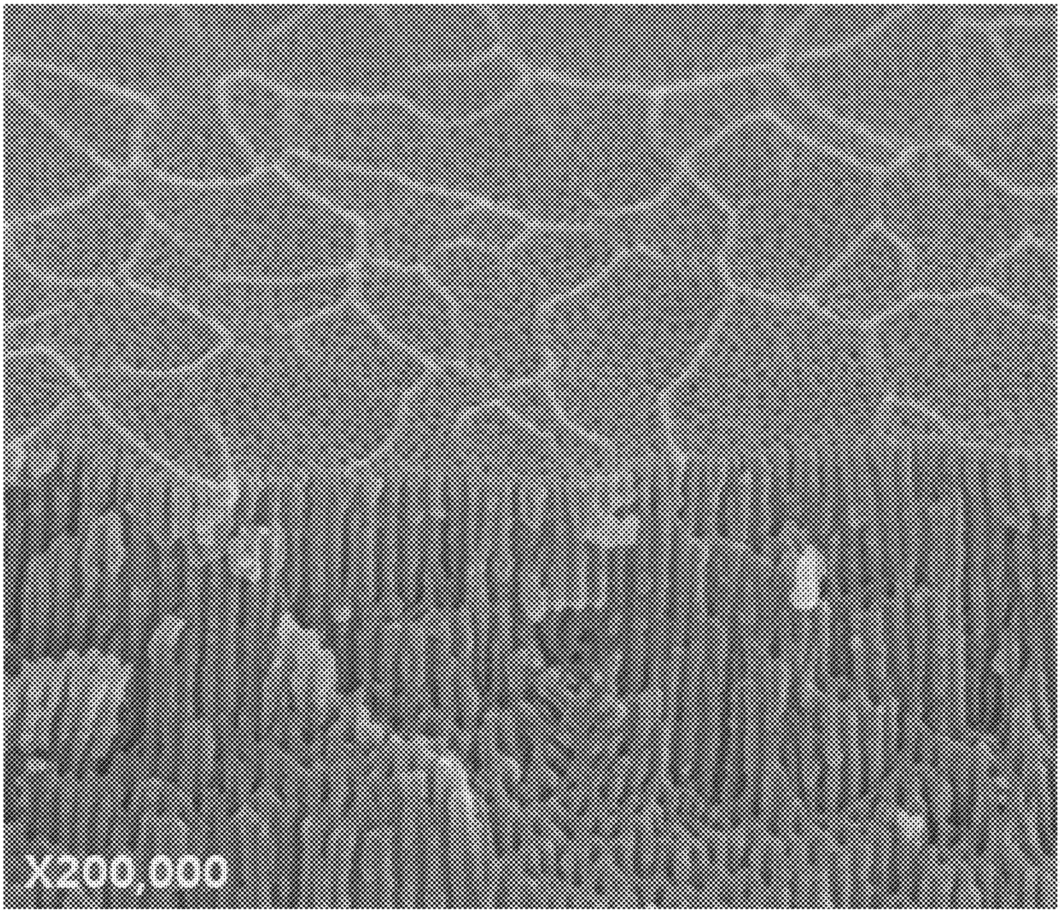
FIG. 2 is a picture of pores on a surface, which are formed through anodizing, taken using a scanning electron microscope (SEM) according to an embodiment of the disclosure.

FIG. 2 is a picture of the pores on the surface, which are formed through the anodizing, taken using a scanning electron microscope (SEM). Referring to FIG. 2, it can be seen that a plurality of fine pores are formed on the surface of the aluminum material by performing the anodizing.

Next, the room-temperature, atmospheric-pressure plasma treating for improving hydrophilicity of the surface of the aluminum material on which the pores are formed may be performed.

Plasma is formed when heat is applied to a gaseous substance and is a group of particles that consist of an ionic nucleus and freely moving electrons. Plasma may collide with a surface of an aluminum material and may decompose various organic matters, remove inorganic matters, and form a highly reactive radical group. Due to the highly reactive radical group being formed, hydrophilicity of the surface of the aluminum material may be improved.

Meanwhile, unlike the conventional plasma treating that uses an inert gas in an anaerobic vacuum atmosphere, the plasma treating according to one example of the present invention may be performed in a room-temperature, atmospheric pressure atmosphere. Therefore, according to the plasma treating of one example of the present invention, a specific gas is not necessary, and productivity may be improved. However, a filter device for removing atmospheric moisture may be necessary.

The room-temperature, atmospheric-pressure plasma treating may be performed in a vertical jet rotating manner.

Figure 3:
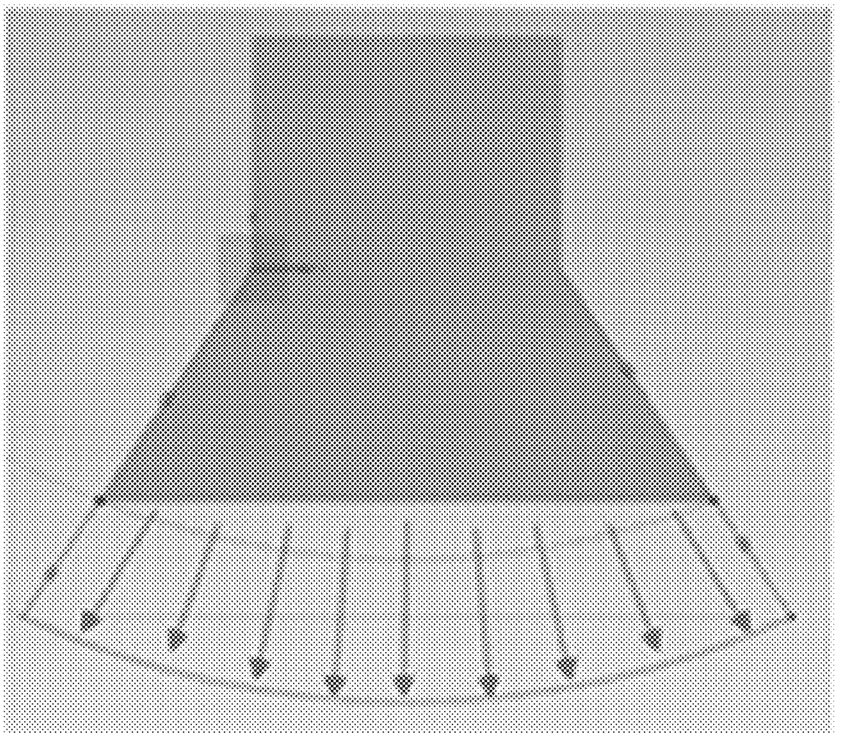
FIG. 3 is a schematic diagram illustrating plasma treating performed in an inclined jet rotating manner according to an embodiment of the disclosure.
Figure 4:
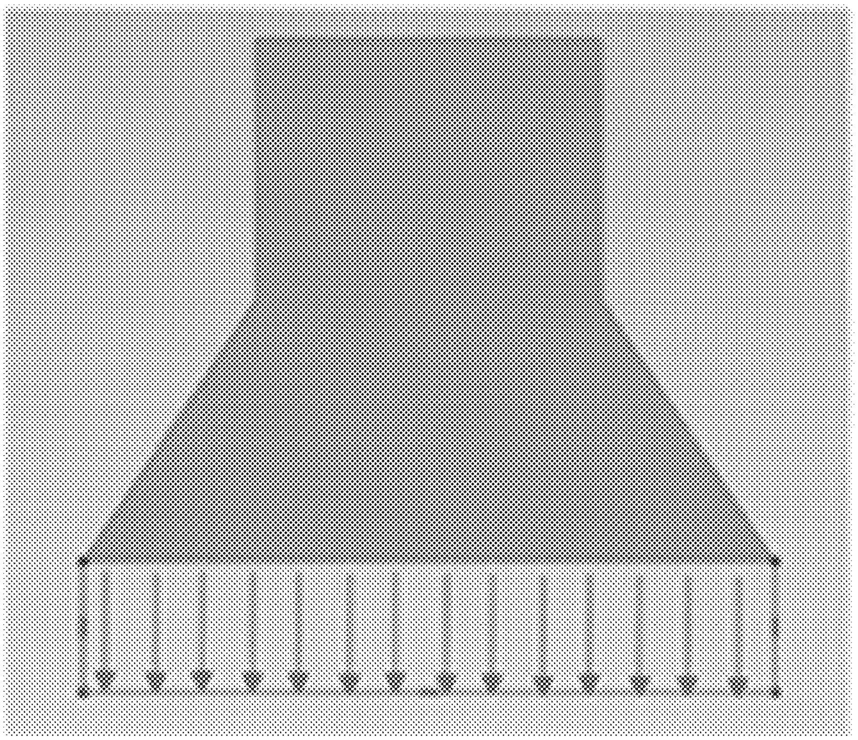
FIG. 4 is a schematic diagram illustrating plasma treating performed in a vertical jet rotating manner according to an embodiment of the disclosure.

FIG. 3 is a schematic diagram illustrating plasma treating performed in an inclined jet rotating manner, and FIG. 4 is a schematic diagram illustrating plasma treating performed in the vertical jet rotating manner.

Referring to FIGS. 3 and 4, in the case of the inclined jet rotating manner, a plasma jet direction is not constant, and there is a concern that plasma loss may occur. However, in the case of the vertical jet rotating manner, a uniform jet is possible, and occurrence of plasma loss may be minimized.

A vertical jet nozzle may have a diameter in a range of 60 mm to 80 mm, and in the vertical jet rotating manner, the number of rotations may be in a range of 12,000 rpm to 30,000 rpm.

Productivity may decrease in a case where the diameter of the nozzle is small, and it may be difficult to perform the plasma treating on an edge of the aluminum material in a case where the diameter of the nozzle is too large. Also, a production speed may be slow and productivity may decrease in a case where the number of rotations is small, and power consumption costs may increase in a case where the number of rotations is too large.

The room-temperature, atmospheric-pressure plasma treating may be performed with a nozzle movement speed in a range of 50 mm/s to 500 mm/s and an output in a range of 500 W to 1,500 W.

Productivity may decrease in a case where an output of a plasma treating device is low, and costs may increase in a case where the output of the plasma treating device is too high. Also, productivity may decrease even in a case where the nozzle movement speed is low, and in a case where the nozzle movement speed is too high, the number of portions on which plasma treating is not performed may increase, and thus an effect of improving hydrophilicity of the surface of the aluminum material may be reduced.

In the room-temperature, atmospheric-pressure plasma treating, an interval between the nozzle and the surface of the aluminum material may be in a range of 1 mm to 4 mm.

In a case where the interval between the nozzle and the surface of the aluminum material is too small, a plasma jet may be focused on a narrow range, and product deformation may occur. However, in a case where the interval between the nozzle and the surface of the aluminum material is too large, plasma jetting may not be sufficiently performed, and the hydrophilicity improving effect may be reduced.

The surface of the aluminum material on which plasma treating is performed may have improved hydrophilicity, and a contact angle between water and the surface of the aluminum material on which plasma treating is performed may be 30° or less.

By improving hydrophilicity of the surface of the aluminum material through the plasma treating, most of the ink jetted in digital printing may be absorbed into the pores. Therefore, removal of the ink due to pore sealing may be prevented, and thus the color fading and resolution reduction problems may be addressed. Also, by increasing the degree to which the ink spreads during digital printing by improving the hydrophilicity of the surface of the aluminum material, resolutions at boundaries may be increased.

A contact angle is an angle at which a thermodynamic equilibrium is reached between a liquid surface and a solid surface and is a measure of wettability of the solid surface. When the contact angle exceeds 30°, since sufficient hydrophilicity is not secured and it is difficult for the ink to be sufficiently absorbed into the pores, an effect of preventing removal of the ink due to pore sealing may be reduced.

Figure 5:
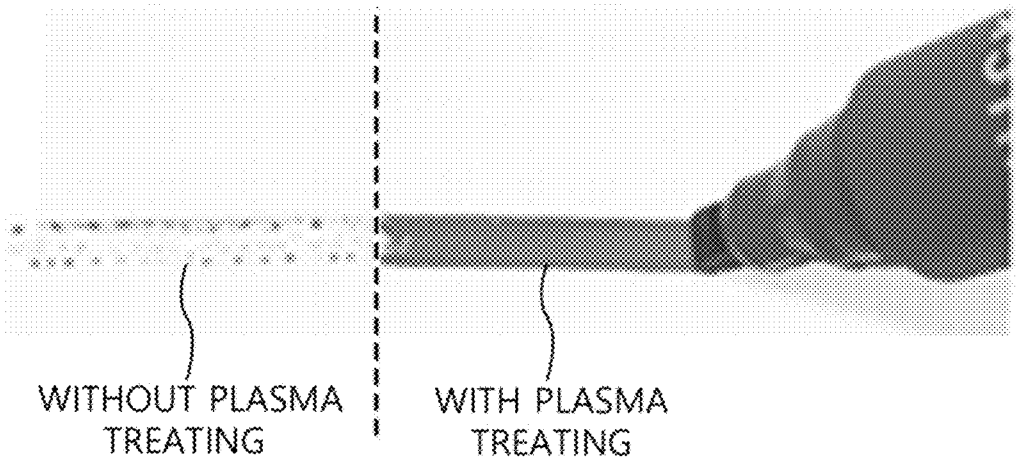
FIG. 5 is a picture of a result of testing, using a Dyne pen, a degree to which hydrophilicity is improved according to plasma treating according to an embodiment of the disclosure.

FIG. 5 is a picture of a result of testing, using a Dyne pen, a degree to which hydrophilicity is improved according to plasma treating.

Referring to FIG. 5, it can be seen that plasma treating has an effect of improving hydrophilicity. Meanwhile, a Dyne pen is a tool with which surface tension of a solid surface may be measured easily and conveniently.

Figure 6:
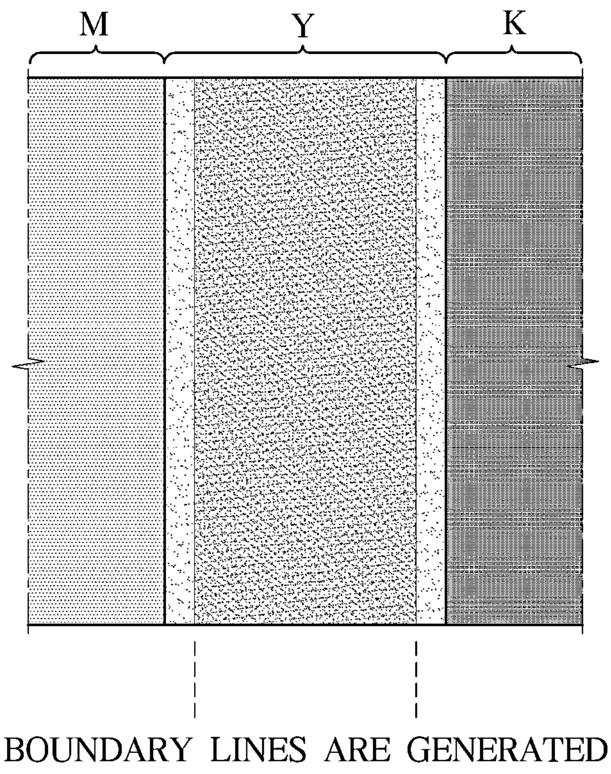
FIG. 6 is a schematic diagram illustrating resolutions at boundaries of an aluminum material on which the plasma treating has not been performed according to an embodiment of the disclosure.
Figure 7:
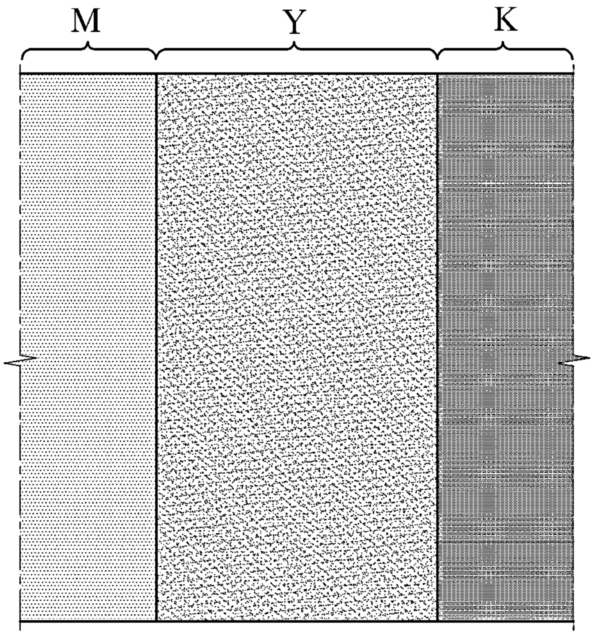
FIG. 7 is a schematic diagram illustrating resolutions at boundaries of an aluminum material on which the plasma treating has been performed according to an embodiment of the disclosure.

FIG. 6 is a schematic diagram illustrating resolutions at boundaries of an aluminum material on which the plasma treating has not been performed, and FIG. 7 is a schematic diagram illustrating resolutions at boundaries of an aluminum material on which the plasma treating has been performed.

During the digital printing, the nozzle is moved back and forth in the horizontal direction, and ink is jetted from the nozzle. The nozzle may slightly move in the vertical direction, surfaces onto which the ink is jetted may partially overlap, and a clear color may be implemented. Thus, the amount of jetted ink is smaller on portions where the surfaces onto which the ink is jetted do not overlap, compared to portions where the surfaces onto which the ink is jetted overlap. Therefore, since the amount of jetted ink is less on edge portions of the surfaces onto which the ink is jetted compared to central portions thereof, boundary lines may be generated.

Meanwhile, in a case where the degree to which the ink spreads is low, boundary lines may be generated on the edge portions even within the same color. That is, in the case where the degree to which the ink spreads is low, resolutions at boundaries may be poor.

Referring to FIGS. 6 and 7, in the case of the aluminum material on which the plasma treating has not been performed, since the degree to which the ink spreads is relatively low, boundary lines are generated on edge portions within color Y (yellow), and thus resolutions at the boundaries are poor. However, in the case of the aluminum material on which the plasma treating has been performed, since the degree to which the ink spreads is high due to high hydrophilicity, boundary lines are hardly generated on the edge portions within color Y (yellow), and thus resolutions at the boundaries are high.

Next, digital printing in which a color and an image are implemented on the surface of the aluminum material whose hydrophilicity is improved may be performed. Digital printing may be performed within an hour after the plasma treating.

When more than an hour passes after the plasma treating, since highly reactive radicals on the surface of the aluminum material are sharply reduced, the hydrophilicity improving effect may be reduced.

Figure 8:
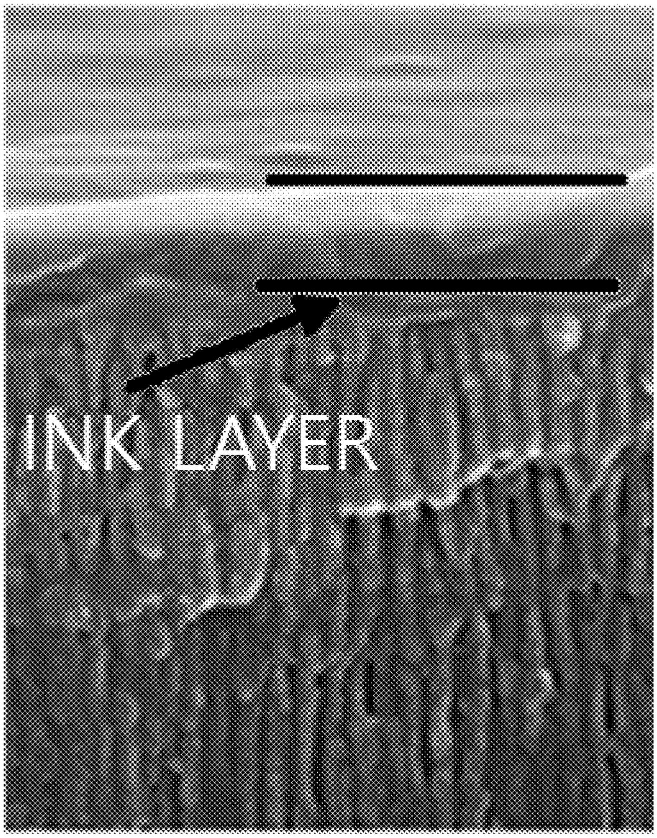
FIG. 8 is a picture of the aluminum material on which the plasma treating has not been performed that is taken using the SEM according to an embodiment of the disclosure.
Figure 9:
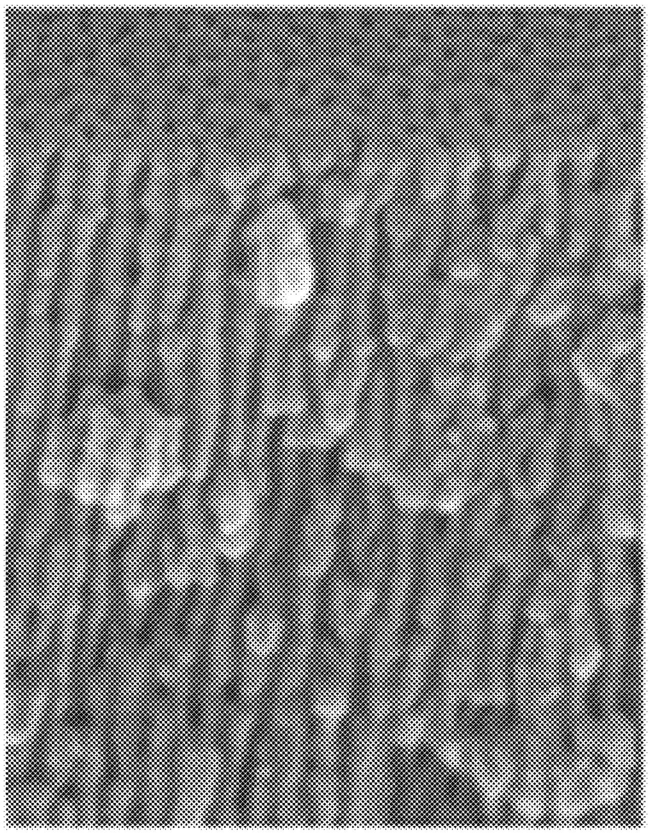
FIG. 9 is a picture of the aluminum material on which the plasma treating has been performed that is taken using the SEM according to an embodiment of the disclosure.

FIG. 8 is a picture of the aluminum material on which the plasma treating has not been performed that is taken using the SEM, and FIG. 9 is a picture of the aluminum material on which the plasma treating has been performed that is taken using the SEM.

Referring to FIGS. 8 and 9, in the case of the aluminum material on which the plasma treating has not been performed, it can be seen that ink is not sufficiently absorbed into the pores, and an ink layer is formed on the surface. However, in the case of the aluminum material on which the plasma treating has been performed, it can be seen that ink is sufficiently absorbed into the pores, and an ink layer is hardly formed on the surface.

Digital printing may be performed using a thermosetting type ink.

Types of ink for typical digital printing may include a thermosetting type ink and an ultraviolet (UV) curing type ink. However, in the case of the UV curing type ink, since curing by UV light occurs immediately after the ink is applied onto a surface of an aluminum material, an absorption rate of the ink into pores is decreased. Therefore, digital printing according to one example of the present invention may be performed using a thermosetting type ink that is relatively smoothly absorbed into pores. However, the present invention is not limited thereto.

Meanwhile, the manufacturing method of an aluminum exterior panel according to one example of the present invention may further include natural drying after digital printing. The natural drying operation may be performed for 5 to 10 minutes at room temperature.

Conventionally, in order to prevent color fading, a thermal drying process is performed for 50 to 100 minutes at a temperature in a range of 65° C. to 95° C. However, according to one example of the present invention, since color fading is prevented through the plasma treating, natural drying may be performed at room temperature without a separate thermal drying process. Therefore, process time and costs may be reduced.

Meanwhile, in a case where the time for which natural drying is performed is short, drying may not be sufficiently performed, and in a case where the time for which natural drying is performed is too long, productivity may decrease.

Next, the pore sealing for closing the pores may be performed. By performing the pore sealing to form an aluminum oxide ($Al_2O_3$) film on the surface of the aluminum material, durability may be maximized to prevent the digital printing layer in the pores from being separated, decolored, discolored, or the like. Also, by a dense film being formed on the outermost layer of the product, ease of cleaning the product may be improved.

The pore sealing may be performed by dipping the aluminum material for 10 to 30 minutes in a solution containing 3 wt % to 4 wt % of nickel acetate at a temperature in a range of 80° C. to 100° C.

In a case where the concentration of the nickel acetate solution is low or the time for which the pore sealing is performed is short, the fine pores may not be sufficiently closed. However, in a case where the concentration of the nickel acetate solution is too high or the time for which the pore sealing is performed is long, white powder may be formed on the surface of the aluminum material, and a separate washing process may be added.

Figure 10:
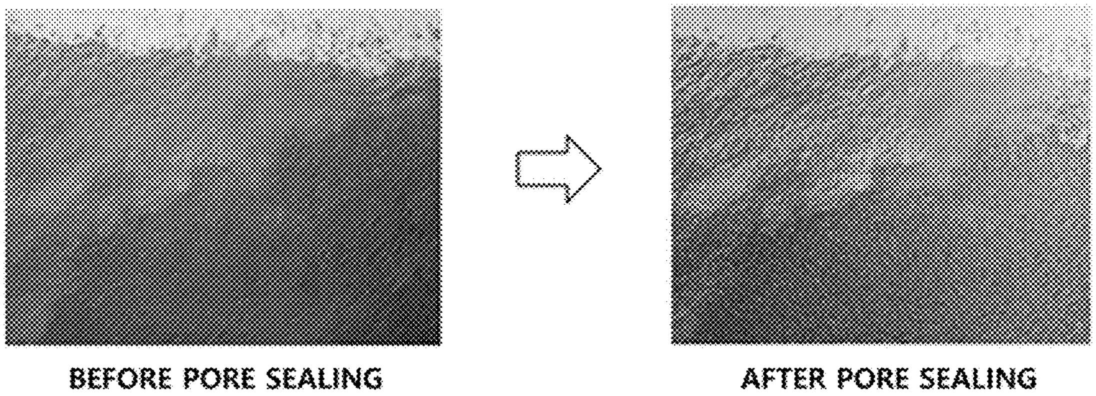
FIG. 10 is a picture of a color fading phenomenon due to pore sealing according to an embodiment of the disclosure.

FIG. 10 is a picture of a color fading phenomenon due to pore sealing.

Referring to FIG. 10, it can be seen that, in an aluminum exterior panel on which the plasma treating has not been performed, some of the ink is removed due to pore sealing performed at a high temperature, and thus a color fading phenomenon clearly occurs. However, according to one example of the present invention, since a large amount of ink is absorbed into the pores through the plasma treating, removal of the ink due to pore sealing is significantly reduced, and the color fading phenomenon can be prevented.

In a manufacturing method of an aluminum exterior panel according to one embodiment of the present invention, by improving hydrophilicity through the plasma treating, it is possible to prevent the color fading phenomenon due to pore sealing. Therefore, an average of L*a*b* color difference (ΔE) values in the aluminum material on which the digital printing is performed and the aluminum material on which the pore sealing is performed may be 5 or less.

Meanwhile, the average of the L*a*b* color difference (ΔE) values being small indicates that the color fading phenomenon due to pore sealing is small. Here, the average is an average of L*a*b* color difference (ΔE) values of all inks used in the digital printing.

Also, a manufacturing method of an aluminum exterior panel according to one embodiment of the present invention may include: preparing an aluminum material; anodizing for forming pores on a surface of the aluminum material; room-temperature, atmospheric-pressure plasma treating for improving hydrophilicity of the surface of the aluminum material on which the pores are formed; digital printing of implementing a color and an image on the surface of the aluminum material whose hydrophilicity is improved; natural drying the aluminum material on which the digital printing is performed; and pore sealing for closing the pores, wherein an average of L*a*b* color difference (ΔE) values in the aluminum material on which the digital printing is performed and the aluminum material on which the pore sealing is performed may be 5 or less.

Also, in the manufacturing method of an aluminum exterior panel according to one embodiment of the present invention, a contact angle between water and the surface of the aluminum material on which plasma treating is performed may be 30° or less.

Next, an aluminum exterior panel with an improved image resolution according to another aspect of the present invention will be described.

An aluminum exterior panel with an improved image resolution according to one embodiment of the present invention may include: an aluminum material; pores formed on a surface of the aluminum material; a digital printing layer provided on one surface or all surfaces of the aluminum material on which the pores are formed; and an aluminum oxide film provided on the digital printing layer.

The aluminum material may have a thickness in a range of 0.5 mm to 5 mm. However, the present invention is not limited thereto, and the aluminum material may have various other thicknesses according to the purpose.

The pores may have a depth in a range of 10 μm to 30 μm. In a case where the depth of the pores is shallow, the amount of ink absorbed into the pores is small, and an excessive amount of ink is seated on the surface and lost. Therefore, in the case where the depth of the pores is shallow, a color fading phenomenon may occur. However, in a case where the depth of the pores is too deep, since it takes a long time to form the pores, productivity may decrease.

The aluminum oxide film may be provided on the digital printing layer. The aluminum oxide film may have a thickness in a range of 10 μm to 30 μm. When the thickness of the aluminum oxide film is thin, durability may decrease. However, when the thickness of the aluminum oxide film is too thick, productivity may decrease.

Next, a refrigerator according to another aspect of the present invention will be described.

Figure 11:
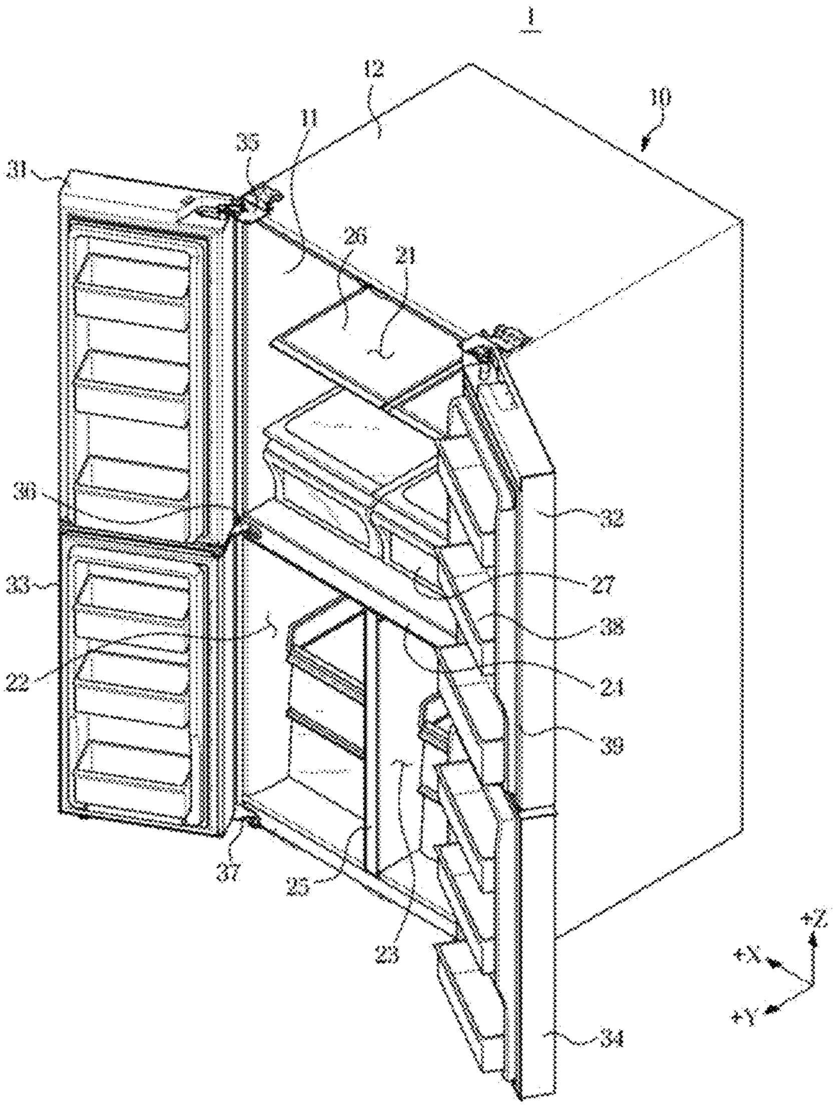
FIG. 11 is a perspective view of a refrigerator according to one embodiment of the present invention.

FIG. 11 is a perspective view of a refrigerator according to one embodiment of the present invention.

In embodiments described below, directions defined by the X-axis, Y-axis, and Z-axis are based on a home appliance, and thus a width direction of the home appliance is defined as the X-axis direction, a depth direction of the home appliance is defined as the Y-axis direction, and a height direction of the home appliance is defined as the Z-axis direction.

FIG. 11 illustrates an exterior of a refrigerator 1 according to one embodiment of the present invention. The home appliance according to one embodiment of the present invention may include an exterior provided using an aluminum exterior panel with an improved image resolution.

Referring to FIG. 11, the refrigerator 1 may include a main body 10, storage compartments 21, 22, and 23 formed inside the main body 10, doors 31, 32, 33, and 34 configured to open or close the storage compartments 21, 22, and 23, and a cold air supply device (not illustrated) configured to supply cold air to the storage compartments 21, 22, and 23.

The main body 10 may include a cavity 11 forming the storage compartments 21, 22, and 23, a cabinet 12 coupled to an outer side of the cavity 11 to form the exterior, and an insulator (not illustrated) provided between the cavity 11 and the cabinet 12 to insulate the storage compartments 21, 22, and 23.

The storage compartments 21, 22, and 23 may be divided by a horizontal partition 24 and a vertical partition 25. The storage compartments 21, 22, and 23 may be divided into an upper storage compartment 21 and lower storage compartments 22 and 23 by the horizontal partition 24, and the lower storage compartments 22 and 23 may be divided into a left lower storage compartment 22 and a right lower storage compartment 23 by the vertical partition 25.

The upper storage compartment 21 may be used as a refrigerating compartment, and the lower storage compartments 22 and 23 may be used as freezing compartments. However, the above-described division and purposes of the storage compartments 21, 22, and 23 are only one example, and the present invention is not limited thereto.

A shelf 26 on which food is placed and a storage container 27 configured to store food may be provided inside the storage compartments 21, 22, and 23.

The cold air supply device may generate cold air using a cooling circulation cycle in which a refrigerant is compressed, condensed, expanded, and evaporated and may supply the generated cold air to the storage compartments 21, 22, and 23.

The storage compartment 21 may be opened or closed by the pair of doors 31 and 32. The doors 31 and 32 may be rotatably coupled to the main body 10. The storage compartment 22 may be opened or closed by the door 33, and the door 33 may be rotatably coupled to the main body 10. The storage compartment 23 may be opened or closed by the door 34, and the door 34 may be rotatably coupled to the main body 10. Hinges 35, 36, and 37 may be provided in the main body 10 to rotatably couple the doors 31, 32, 33, and 34 to the main body 10.

A door guard 38 configured to store food and a door gasket 39 configured to come in close contact with a front surface of the main body 10 to seal the storage compartments 21, 22, and 23 may be provided on back surfaces of the doors 31, 32, 33, and 34.

An aluminum exterior panel with an improved image resolution may be provided on at least one portion of the cabinet 12 of the main body 10. Since the aluminum exterior panel is the same as the aluminum exterior panel described above, detailed description thereof will be omitted.

Also, an aluminum exterior panel with an improved image resolution may be provided on the exterior of the doors 31, 32, 33, and 34. Since the aluminum exterior panel is the same as the aluminum exterior panel described above, description thereof will be omitted.

Figure 12:
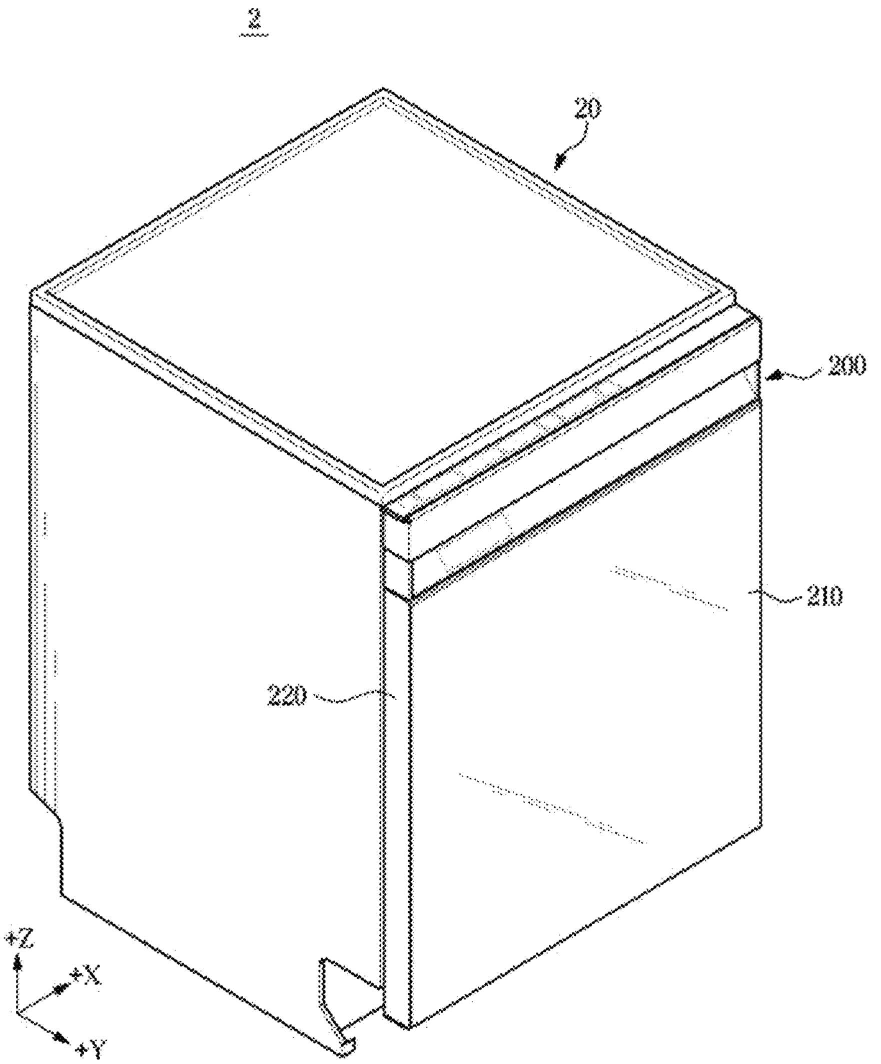
FIG. 12 is an exterior view of a dish washer according to one embodiment of the present invention.

FIG. 12 is an exterior view of a dish washer according to one embodiment.

Referring to FIG. 12, a dish washer 2 may include a main body 20 forming an exterior and a door 200 rotatably coupled to the main body 20.

A washing compartment (not illustrated) configured to accommodate dishes may be provided inside the main body 20. The dish washer 2 may include various components such as a plurality of nozzles configured to wash the dishes accommodated in the washing compartment, a driving device configured to drive the plurality of nozzles, and a controller configured to control the driving device. The door 200 may open or close the washing compartment provided inside the main body 20.

The door 200 may include a door panel 210 and a door body 220, and the door panel 210 may be detachably coupled to the door body 220. As illustrated in FIG. 11, the door panel 210 may be provided on a front surface of the door 200, and the door body 220 may be provided on a rear surface of the door 200. The front surface of the door 200 may be a surface visible to a user in a state in which the door 200 is closed, and the rear surface of the door 200 may be a surface toward the inside of the main body 20 in the state in which the door 200 is closed.

Figure 13:
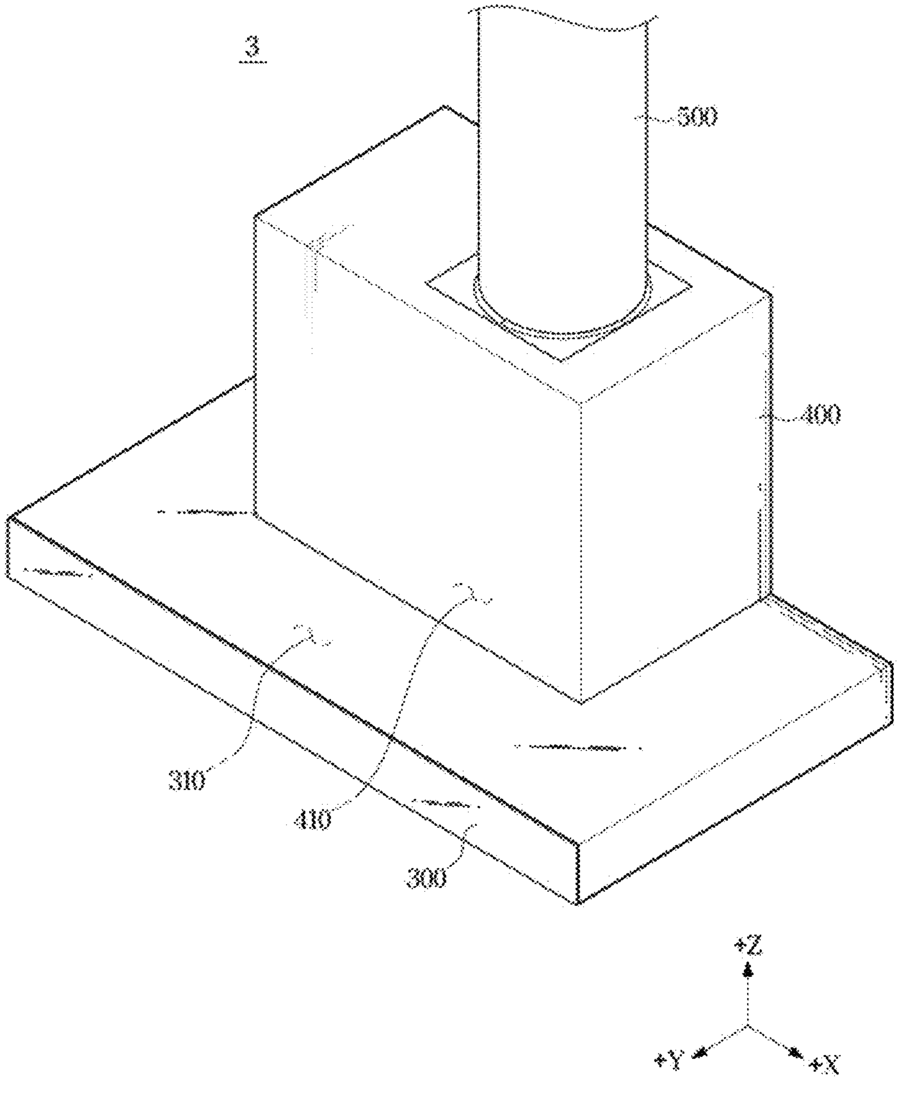
FIG. 13 is an exterior view of a hood according to one embodiment of the present invention.

FIG. 13 is an exterior view of a hood according to one embodiment.

Referring to FIG. 13, a hood 3 according to one embodiment of the present invention may include a main body, which includes a first case 300 and a second case 400, and a fan module (not illustrated).

The first case 300 may include an inlet into which smoke or the like generated from a heating device is introduced. The inlet may be provided on a lower surface of the first case 300. A filter corresponding to the inlet may be mounted on the inlet. The filter may be mounted on the first case 300 to cover the inlet. The filter may be provided to filter foreign matter contained in the smoke or the like introduced into the inlet.

The first case 300 may be provided in a substantially rectangular parallelepiped shape. A flow path 310 may be formed inside the first case 300. The flow path 310 may be provided to guide air, which has passed through the filter and the inlet, to the second case 400. The flow path 310 may outline a space inside the first case 300, or alternatively may outline a space separately partitioned inside the first case 300 or a duct installed inside the first case 300.

The second case 400 may be disposed above the first case 300. The fan module may be disposed inside the second case 400. Like the first case 300, the second case 400 may be provided in a substantially rectangular parallelepiped shape. The second case 400 may be provided to have areas of a lower surface and an upper surface smaller than those of the first case 300 and a height greater than that of the first case 300. The second case 400 may be provided separately from the first case 300 and coupled thereto, or alternatively, the second case 400 and the first case 300 may be integrally provided. Also, the second case 400 may be provided by an upper surface of the first case 300 extending upward to be inclined relative to a first direction (Z-axis direction), and in this way, the second case 400 and the first case 300 may be integrally formed.

A flow path 410 may be formed inside the second case 400. The flow path 410 may be connected to the flow path 310 of the first case 300. Air introduced through the inlet may be discharged to the outside through an exhaust pipe 500 via the flow path 310 of the first case 300 and the flow path 410 of the second case 400. The fan module may be provided inside the flow path 410. The flow path 410 may outline a space inside the second case 400, or alternatively may outline a space separately partitioned inside the second case 400 or a duct installed inside the second case 400.

All of the home appliances 1, 2, and 3 according to the above-described examples include a panel forming the exterior of the main body 10, 20, 300, or 400. The aluminum exterior panel with an improved image resolution according to one example of the present invention may be used in other home appliances without particular limitations as long as the aluminum exterior panel may form an exterior of the home appliance and may be disposed at a position visible to a user.

Also, the aluminum exterior panel is not necessarily used as the panel of the main body 10, 20, 300, or 400. The home appliances 1 and 2 including the doors 31, 32, 33, and 34 or the door 200 used to open and close the space inside the main body 10 or the space inside the main body 20 include door panels forming the exterior of the doors 31, 32, 33, and 34 or a door panel forming the exterior of the door 200. That is, the door panels are visible to a user in a state in which the doors 31, 32, 33, 34, and 200 are closed. The doors 31, 32, 33, 34, and 200 are closed when the home appliances 1 and 2 are not used, and in order to use the home appliances 1 and 2, the user has to approach and open the doors 31, 32, 33, 34, and 200.

Panels of the main bodies 10, 20, 300 and 400 and/or door panels 110, 210, 310, and 410 may be seen as components that have a great influence on aesthetic satisfaction of a user, durability, and usability.

In order to improve aesthetic satisfaction of the user without affecting functional performance of the main bodies 10, 20, 300, and 400 and/or the doors 31, 32, 33, 34, and 200, an image or a pattern may be implemented on the main body panels and/or door panels. Therefore, the aesthetic satisfaction of the user with the home appliances 1, 2, and 3 may be improved.

Also, an example of a factor that may improve the durability of the main bodies 10, 20, 300, and 400 and/or the doors 31, 32, 33, 34, and 200 may be surface hardness of the main body panels and/or door panels. When the surface hardness of the panel is increased, resistance to everyday scratches or dents that may be formed in a user environment may be improved for the exterior of the home appliances 1, 2, and 3.

Further, for various contamination conditions that may occur in the user environment, when it is easy to remove contaminants on the main body panels and/or door panels, ease of cleaning the main bodies 10, 20, 300, and 400 and/or the doors 31, 32, 33, 34, and 200 may be improved.

To this end, the above-described aluminum exterior panel according to one example of the present invention may be used as the main body panels and/or door panels of the home appliances 1, 2, and 3.

Meanwhile, the above-described home appliances are only some examples of the home appliance according to one embodiment. Therefore, home appliances other than those described above may be included in an embodiment of the present invention as long as the home appliances include the above-described aluminum exterior panel with an improved image resolution.

Hereinafter, examples and comparative examples will be described to help understanding of the present invention. However, the following description only corresponds to one example relating to the content and advantageous effects of the present invention, and the scope of rights and the advantageous effects of the present invention are not necessarily limited thereto.

EXAMPLES

<Contact Angle Measurement Test>

Table 1 below shows contact angles measured according to plasma task conditions using a contact angle measurer for an aluminum material on which plasma treating is performed according to one example of the present invention.

The plasma treating was performed in a vertical jet rotating manner by varying a nozzle movement speed under conditions in which a nozzle diameter was 80 mm, the number of rotations was 1,500 rpm, an output was 1,500 W, and an interval between the nozzle and a surface of the aluminum material was 4.0 mm.

TABLE 1

| | Nozzle movement speed (mm/s) | | | |
|---|---|---|---|---|
| | 700 | 500 | 100 | 50 |
| Contact angle (°) | 45.67 | 29.56 | 24.32 | 23.19 |

Referring to Table 1, when the nozzle movement speed exceeded 500 mm/s, the contact angle of 30° or less was not satisfied. That is, when the nozzle movement speed exceeds 500 mm/s, hydrophilicity becomes poor, and thus a color fading phenomenon may occur due to pore sealing. Meanwhile, in the case of the aluminum material on which the plasma treating was not performed, the contact angle was measured to be 70.08°. That is, hydrophilicity of the surface of the aluminum material on which the plasma treating was not performed was very poor.

<CIE L*a*b* Color Difference Measurement Test>

Table 2 below shows color difference values before and after pore sealing of the aluminum material on which the plasma treating was not performed and the aluminum material on which the plasma treating was performed.

The CIE L*a*b* color differences were measured using a spectrophotometer. Meanwhile, it may be determined that the smaller a color difference value before and after the pore sealing, the less prominent the color fading phenomenon.

TABLE 2

| Without plasma treating | | | | | With plasma treating | | | | |
|---|---|---|---|---|---|---|---|---|---|
| | | Before pore sealing | After pore sealing | ΔE | | | Before pore sealing | After pore sealing | ΔE |
| C | L | 63.69 | 67.09 | 5.71 | C | L | 75.31 | 76.1 | 5.55 |
| (Cyan) | a | −16.8 | −21.21 | | (Cyan) | a | −10.35 | −13.46 | |
| | b | −14.09 | −12.82 | | | b | −6.12 | −10.65 | |
| M | L | 48.82 | 52.76 | 9.50 | M | L | 62.51 | 62.95 | 4.55 |
| (Magenta) | a | 49.42 | 40.84 | | (Magenta) | a | 37.63 | 35.37 | |
| | b | −1.41 | −2.5 | | | b | −4.89 | −8.82 | |
| Y | L | 73.75 | 74.75 | 5.02 | Y | L | 80.58 | 83.98 | 5.79 |
| (Yellow) | a | 1.38 | 0.79 | | (Yellow) | a | 0.04 | −1.1 | |
| | b | 44.98 | 40.1 | | | b | 20.8 | 25.34 | |
| K | L | 23.97 | 26.05 | 2.40 | K | L | 27.12 | 30.04 | 3.95 |
| (Black) | a | 0.01 | −1.15 | | (Black) | a | −2.25 | −4.76 | |
| | b | 0.27 | 0.57 | | | b | 6.88 | 6.01 | |
| R | L | 45.09 | 47.42 | 10.25 | R | L | 58.45 | 60.55 | 5.42 |
| (Red) | a | 46.91 | 38.37 | | (Red) | a | 33.76 | 28.85 | |
| | b | 32.42 | 27.25 | | | b | 26 | 26.93 | |
| G | L | 63.71 | 65.51 | 6.09 | G | L | 74.27 | 75.98 | 3.43 |
| (Green) | a | −20.35 | −18.93 | | (Green) | a | −13.27 | −14.86 | |
| | b | 33.39 | 27.75 | | | b | 21.58 | 24.09 | |
| B | L | 44.24 | 48.9 | 8.43 | B | L | 60.28 | 62.54 | 5.54 |
| (Blue) | a | −0.07 | −6.91 | | (Blue) | a | −2.25 | −6.32 | |
| | b | −26.83 | −25.21 | | | b | −19.51 | −22.51 | |
| Average | — | — | — | 6.77 | Average | — | — | — | 4.89 |

Referring to Table 2, in the aluminum material on which the plasma treating was performed, color difference values before and after pore sealing were smaller compared to the aluminum material on which the plasma treating was not performed, and the ΔE values satisfied an average of 5 or less. That is, it was confirmed that a color fading phenomenon decreased due to the plasma treating.

<Test of Measuring Amount of Ink Absorbed into Pores>

Table 3 below shows amounts of ink absorbed into pores of the aluminum material on which the plasma treating was not performed and the aluminum material on which the plasma treating was performed.

The amount of ink absorbed into pores was measured using a degree to which C (carbon), which is a main component of ink, is absorbed into the pores. Here, through cross-sectional analysis using a field emission transmission electron microscope (FE-TEM), the content of C according to the depth of the pores was measured. The content of C indicates wt % occupied by C when the total amount of all elements included in the cross-section is 100 wt %. It may be determined that the higher the content of C, the larger the amount of absorbed ink.

Meanwhile, samples in which pores had a depth of 15 μm were used.

TABLE 3

| | | Depth of pores (μm) | | | |
|---|---|---|---|---|---|
| | | 0 | 5 | 10 | 15 |
| Content of C (wt %) | Without plasma treating | 15.38 | 4.8 | 0 | 0 |
| | With plasma treating | 15.38 | 9.4 | 5.2 | 4.8 |

Referring to Table 3, the amount of ink absorbed into the pores was larger in the aluminum material on which the plasma treating was performed compared to the aluminum material on which the plasma treating was not performed. That is, it was determined that, in the aluminum material on which the plasma treating was performed, removal of the ink due to pore sealing was prevented, and thus a color fading phenomenon was eliminated.

According to one example of the present invention, it is possible to provide an aluminum exterior panel and a manufacturing method thereof in which hydrophilicity of a surface of an aluminum material is secured through room-temperature, atmospheric-pressure plasma treating to inject a large amount of ink into pores, thereby addressing color fading and improving a resolution after pore sealing. Thus, industrial applicability is recognized.

What is claimed is:

1. A method of manufacturing an aluminum panel comprising:

anodizing a panel including an aluminum material to form pores on a surface of the aluminum material;

atmospheric-pressure plasma treating the anodized panel, at room-temperature, such that a hydrophilicity of the surface corresponds to a contact angle between water and the surface is 30° of less;

digital printing an ink on the surface such that the ink is absorbed into the pores; and forming an aluminum oxide film on the surface such that the aluminum oxide film covers the pores so as to seal the ink inside the pores to thereby prevent separation of the ink from the pores.

2. The method of claim 1, further comprising drying the surface without heating the surface after the digital printing.

3. The method of claim 1, wherein the atmospheric-pressure plasma treating includes:

rotating the panel, and moving plasma in a vertical direction at the rotating panel through a vertical jet nozzle.

4. The method of claim 3, wherein the vertical jet nozzle has a diameter in a range of 60 mm to 80 mm.

5. The method of claim 3, wherein, the rotating includes rotating the panel in a range of 12,000 rpm to 30,000 rpm.

6. The method of claim 1, wherein the atmospheric-pressure plasma treating is performed with a nozzle movement speed in a range of 50 mm/s to 500 mm/s and an output in a range of 500 W to 1,500 W.

7. The method of claim 1, wherein, in the atmospheric-pressure plasma treating, an interval between a nozzle and the surface is in a range of 1 mm to 4 mm.

8. The method of claim 1, wherein the digital printing is performed within an hour after the atmospheric-pressure plasma treating.

9. The method of claim 1, wherein the forming includes dipping the panel in a solution containing 3 wt % to 4 wt % of nickel acetate at a temperature in a range of 80° C. to 100° C. for 10 to 30 minutes.

10. The method of claim 1, wherein an average of L*a*b* color difference (ΔE) values in the aluminum material on which the digital printing is performed and the aluminum material on which the sealing is performed is 5 or less.

11. An aluminum panel comprising:

an aluminum material;

pores on a surface of the aluminum material, the surface having a hydrophilicity such that a contact angle between water and the surface is 30° of less;

ink absorbed into the pores; and an aluminum oxide film on the surface such that the aluminum oxide film covers the pores so as to seal the ink inside the pores to thereby prevent separation of the ink from the pores.

12. The aluminum panel of claim 11, wherein the aluminum material has a thickness in a range of 0.5 mm to 5 mm.

13. The aluminum panel of claim 11, wherein the pores have a depth in a range of 10 μm to 30 μm such that a carbon content of a cross-section of the surface, corresponding to an amount of the ink absorbed into the pores, is greater than or equal to 4.8 weight % relative to a total weight of all elements at a depth of 15 μm as determined by cross-sectional analysis with a field emission transmission electron microscope.

14. The aluminum panel of claim 11, wherein the aluminum oxide film has a thickness in a range of 10 μm to 30 μm.

* * * * *